United States Patent [19]
Sakai

[11] Patent Number: 5,818,567
[45] Date of Patent: Oct. 6, 1998

[54] FRAME STRUCTURE FOR EYEGLASSES HAVING A SPRING-HINGE

[75] Inventor: Yuichi Sakai, Fukui, Japan

[73] Assignee: Shuyu Co., Ltd., Sabae, Japan

[21] Appl. No.: 806,600

[22] Filed: Feb. 26, 1997

[30] Foreign Application Priority Data

Oct. 30, 1996 [JP] Japan .................................. 8-305885

[51] Int. Cl.⁶ .................................................. G02C 5/16
[52] U.S. Cl. .......................... 351/113; 351/114; 351/153; 16/228
[58] Field of Search .................................. 351/111, 113, 351/114, 119, 121, 153; 16/228

[56] References Cited

U.S. PATENT DOCUMENTS 3,713,731  1/1973  Gardner ................................ 351/113
3,923,384  12/1975 Leblanc ................................. 351/113
4,995,713  2/1991  Curto et al. ............................ 351/113

*Primary Examiner*—Huy Mai
*Attorney, Agent, or Firm*—Nikaido, Marmelstein, Murray & Oram LLP

[57] ABSTRACT

Disclosed is an improved frame structure for glasses using two counter joint pieces loosely coupled with a screw. One of these joint pieces is fixed to the rim projection, and the other joint piece is fixed to the temple, and these joint pieces are pulled toward each other under the resilient influence, which is caused by the spring plate of the joint piece on the temple side, thereby assuring the stable folding and unfolding of the temples on the front, still permitting each temple to move a short distance from the 90 degree-wide unfolding or linear-alignment with the rim projection like the "Spring Hinge".

4 Claims, 4 Drawing Sheets

FRAME STRUCTURE FOR EYEGLASSES HAVING A SPRING-HINGE

BACKGROUND OF THE INVENTION

1. Field of the Invention

The present invention relates to a frame structure for eyeglasses having each temple jointed to the associated rim via a spring-hinge.

2. Description of Related Art

Referring to FIG. 7, the temple is foldably connected to the rim via an associated hinge. Specifically a joint is soldered to the rim, and one of the counter pieces of the hinge is soldered to the inner surface of the joint, and the other piece is soldered to the inner surface of the temple, thereby permitting the temple to be folded or unfolded on the front of the frame. The screw is, however, liable to loosen on the hinge, and therefore, at an early stage of use the temple cannot be folded or unfolded steadily on the front of the frame. Also, disadvantageously, a pair of glasses cannot be put in correct position on the face because appreciable wears are caused in some joint parts, which slide on each other in folding or unfolding the temple from the front.

Hinges are so small in size that they cannot be made with ease. The hinge cannot allow the temple to open wide beyond the linear alignment with the joint, as shown in solid lines in FIG. 6. The ninety degree-wide angle is adequate to wear the glasses on the face, and some flexibility of the temple permits the fitting of the glasses on the face by causing the temple to be bent yieldingly beyond the ninety degree-wide angle as required.

Such fitting capability, however, will be lost at an early stage of use. The resilience which permits the temple to return to its stress-free, initial position if a bending force is removed, cannot be lost so far as the temple is bent within the limit of permissible deformation, but the hinge connecting the temple to the rim is liable to be loosened. Also, disadvantageously the hinge joint cannot absorb any shock if applied to the frame, thus causing the falling-off of the glasses from the face, the breaking of lenses or the deforming of the frame.

In an attempt to solve such problems a joint structure for glasses permitting each temple to open wide somewhat beyond the linear alignment of the temple to the rim joint has been proposed. One example of such joint structure is shown in FIG. 8, and is called "Spring Hinge". As shown, a stationary joint piece "c" of the "Spring Hinge" is soldered to the joint "a", and a slidable joint piece "d" is fixed to the temple "b" so as to permit it to slide a given distance on a guide piece "e", which is fixed to the inner surface of the temple "b". The slidable joint piece "d" is equipped with a coiled spring (not shown), which is compressed in response to the unfolding of the temple beyond the linear alignment with the rim joint, thereby applying a restoring force to the temple. As may be readily understood, the "Spring Hinge" is complicated in structure, accordingly increasing the number of steps in manufacturing, and costing much. Still disadvantageously, the complicated hinge structure is liable to work unsatisfactorily, and such a malfunction can be hardly reduced once it has been caused.

As is the case with a conventional hinge, the "Spring Hinge" cannot be free of the trouble of loosening, thereby causing the unstable standing of the temple on the front.

SUMMARY OF THE INVENTION

In view of the above one object of the present invention is to provide an improved frame structure for eyeglasses, which is simple in structure, permitting the folding and unfolding of the temple without using any conventional hinge structures, thus guaranteed to be free of any loosening of the temple relative to the rim joint.

To attain this object a frame structure for eyeglasses comprising a front having two rims connected by an associated bridge and two temples each foldably hinged to the outer edge of each rim via an associated joint, is improved according to the present invention in that it includes first and second joint pieces fixed to the rim and the temple respectively, the first joint piece fixed to the rim comprises a curved (or bent) joint section having an elongated hole made therein whereas the second joint piece fixed to the temple comprises a joint section having a circular hole made therein and an elongated spring plate extending to and abutting on the curved (or bending) surface of the curved (or bent) joint section of the first joint piece, said first and second joint pieces being rotatably coupled with an associated screw inserted in the elongated hole and the circular hole.

More specifically, the first joint piece is composed of a relatively thick stand section fixed to the rim joint and a relatively thin, curved or bent joint section integrally connected to the stand section and projecting therefrom. The joint section has an elongated hole made therein, and its lower edge close to the stand section is curved or bent to level off. The second joint piece is composed of a "U"-shaped base section having two opposite trailing walls and a rising-and-levelling bottom, and an elongated spring plate. The trailing walls have circular holes made therein, and the elongated spring plate is fixed to the plateau of the bottom to extend to the fronts of the trailing walls, ending with a curved or bent up end, the curvature of which corresponds to the curved or bent surface of the joint section of the first joint piece. The first joint piece on the rim joint side is loosely coupled with the second joint piece on the temple side by inserting the thin, curved or bent joint section of the first joint piece in between the opposite trailing walls of the second joint piece with their elongated and circular holes aligned, and by inserting a screw in the elongated hole of the joint section of the first joint piece and the circular holes of the "U"-shaped base section of the second joint piece.

The first and second joint pieces are loosely connected by the screw to permit fold and unfold each temple relative to the front by rotating about the screw. The screw is allowed to move in the elongated hole of the first joint piece, thereby allowing the second joint piece and hence the temple to move relative to the first joint piece. The curved or bent end of the elongated spring plate abuts on the curved or bent surface of the joint section of the first joint piece, thereby constantly applying a resilient force to the temple, which resilient force keeps the temple in the linear-alignment with the rim joint when it is raised from the front to the unfolded position, and yielding to permit the temple to open outward more or less beyond the linear-alignment in response to a gentle opening force if applied to the temple, still forcing the temple to return to the linear-alignment with the rim joint, thus permitting the temple to be put in the equilibrium stable position on the face.

Other objects and advantages of the present invention will be understood from the following description of a frame structure for glasses according to a sole embodiment of the present invention, which is shown in accompanying drawings.

DESCRIPTION OF THE PREFERRED EMBODIMENTS

Figure 1:
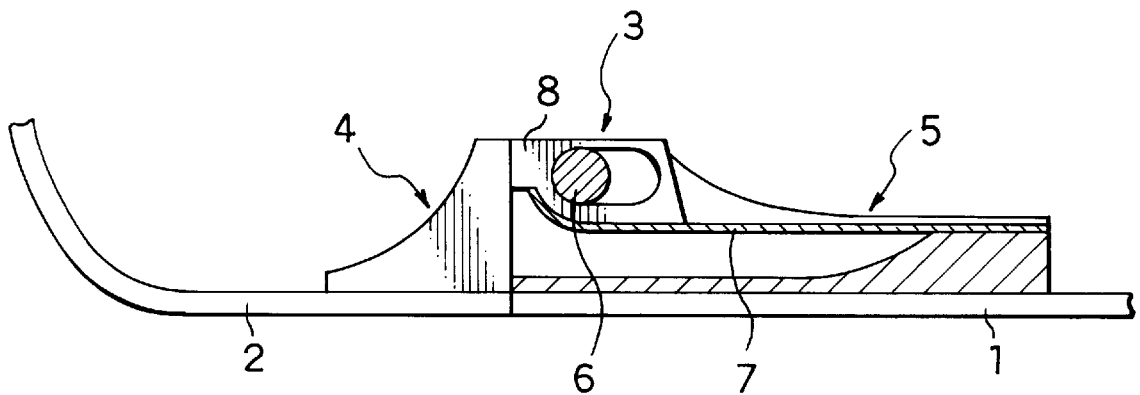
FIG. 1 illustrates a frame structure for glasses according to the present invention, showing how the temple is hinged to the rim joint.

A frame structure for eyeglasses comprises a front having two rims connected by an associated bridge and two temples each foldably hinged to the outer edge of each rim via an associated joint structure. FIG. 1 shows how the temple 1 is hinged to the rim (not shown) via the rim projection 2 and an associated joint assembly. The joint assembly comprises first and second joint pieces 4 and 5 fixed to the rim (not shown) and the temple 1 respectively. These first and second joint pieces 4 and 5 are loosely connected by a screw 6, about which the temple 1 can rotate.

Figure 2A:
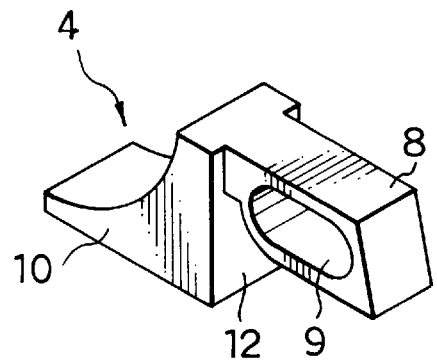
FIG. 2a is a perspective view of the first joint piece of the frame structure.
Figure 2B:
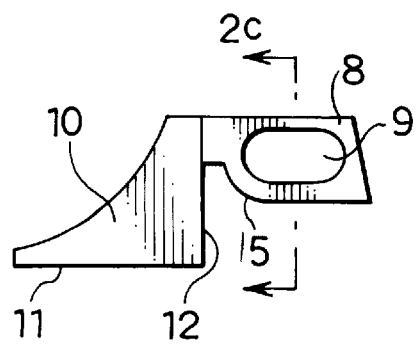
FIG. 2b is a side view of the first joint piece.
Figure 2C:
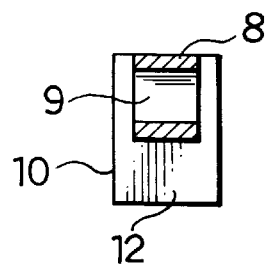
FIG. 2c is a section view of the first joint piece taken along line 2c—2c in FIG. 2b.

Referring to FIGS. 2a to 2c, the first joint piece 4 on the rim side comprises a curved joint section having an elongated hole 9 made therein. Specifically, it is composed of a relatively thick, triangular-shaped stand section 10 fixed to the rim joint or projection 2 and a relatively thin, cantilever-like joint section 8 integrally connected to the top of the triangular-shaped stand section 10 and extending backward. The bottom side 11 of the triangular-shaped stand section 10 is soldered to the rim projection 2. The cantilever-like joint section 8 has an elongated hole 9 made therein, and its lower edge close to the vertical wall 12 of the stand section 10 is curved to level off.

Figure 3A:
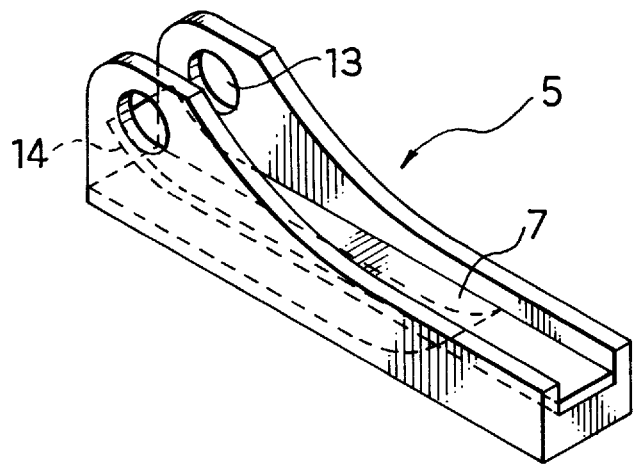
FIG. 3a is a perspective view of the second joint piece of the frame structure.
Figure 3B:
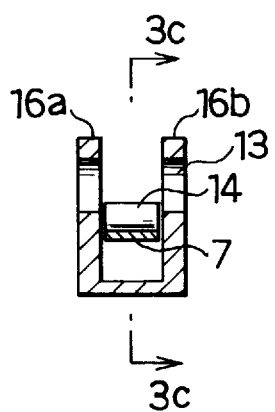
FIG. 3b is a section view taken along line 3b—3b in FIG. 3c.
Figure 3C:
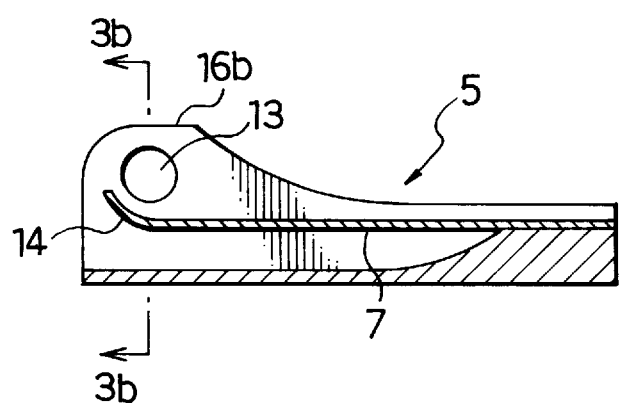
FIG. 3c is a section view of the second joint piece taken along line 3c—3c in FIG. 3b.

Referring to FIGS. 3a to 3c, the second joint piece 5 on the temple side is composed of a "U"-shaped base section having two opposite trailing walls 16a and 16b and a rising-and-levelling bottom, and an elongated spring plate 7. The trailing walls 16a and 16b have circular holes 13 made therein, and the elongated spring plate 7 is put between the opposite trailing walls 16a and 16b, and the rear end of the spring plate 7 is fixed to the plateau of the rising-and-levelling bottom to extend forward to the fronts of the trailing walls 16a and 16b. The cantilever-like spring plate 7 ends with a curved end 14, the curvature of which curved end corresponds to the curved surface 15 of the cantilever-like joint section 8 of the first joint piece 4.

The cantilever-like joint section 8 is fitted in between the opposite walls 16a and 16b of the second joint piece 5 with their elongated and circular holes aligned, and with the curved surface 15 fitting on the curved end 14 of the spring plate 7. The first joint piece 4 is loosely coupled with the second joint piece 5 by inserting a screw 6 in the elongated hole 9 of the first joint piece 4 and the circular holes 13 the "U"-shaped base section of the second joint piece 5. The screw 6 can move in the elongated hole 9 of the first joint piece 4, thereby permitting the temple 1 to move a short distance corresponding to the longer diameter of the elongated hole 9. The second joint piece 5 and hence, the temple 1, however, is pulled toward the rim under the resilient influence, which is caused by the spring plate 7 abutting on the curved surface 15 of the first joint piece 4. Thus, the front rises of the opposite walls 16a and 16b of the second joint piece 5 abut on the vertical wall 12 of the triangular-shaped stand section 10 of the first joint piece 4, and in this position the second joint piece 5 is pulled toward the rim, and is kept pulled by the spring plate 7.

Figure 5:
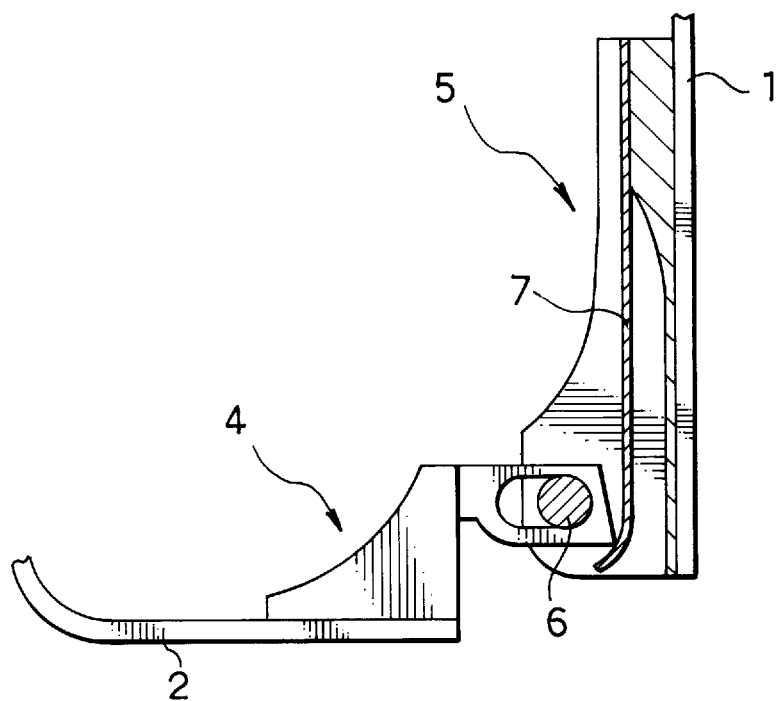
FIG. 5 illustrates the frame structure with the temple folded on the front.

FIG. 5 shows the temple 1 as being folded on the front. In this folding position the second joint piece 5 and the temple 1 are perpendicular to the rim projection 2. The second joint piece 5 is rotated about the screw 6 so that the spring plate 7 is pushed by the lower, acute edge of the cantilever-like projection 8 to bend, producing the resilient force to hold the temple 1 in a stable position. In this position the screw 6 is driven to the right end of the elongated hole 6.

Figure 6:
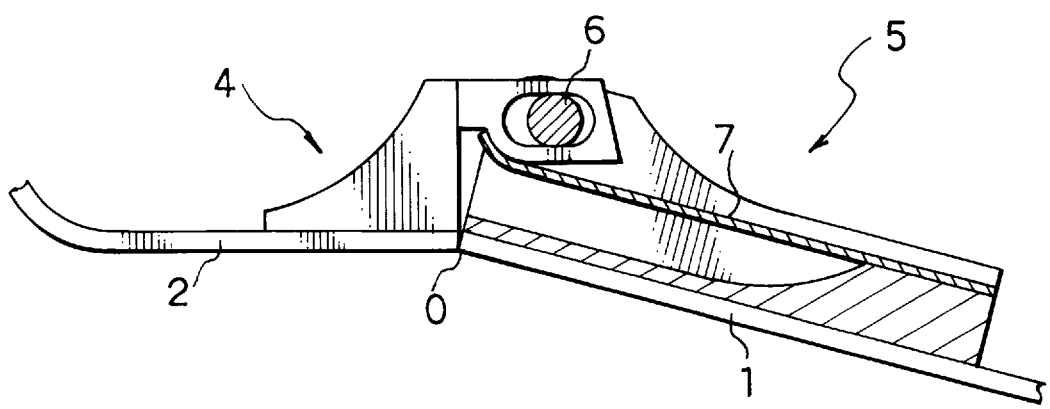
FIG. 6 illustrates the frame structure with the temple unfolded, pushed outward from the linear alignment with the rim joint.
Figure 7:
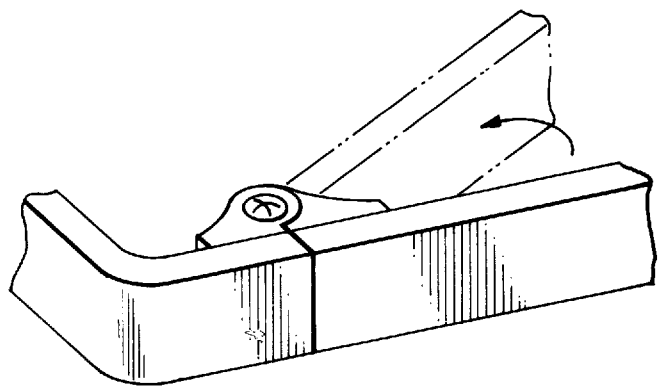
FIG. 7 illustrates a conventional frame structure.
Figure 8:
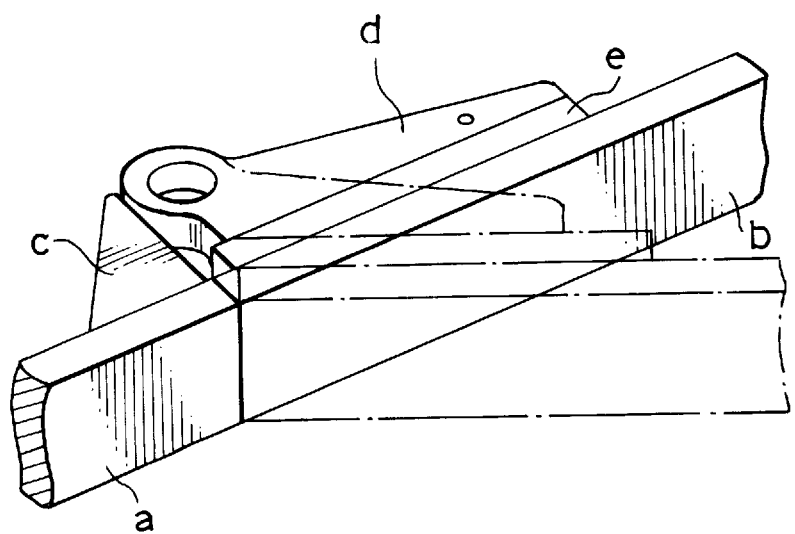
FIG. 8 illustrates another conventional frame structure.

FIG. 6 shows the temple 1 as being unfolded and pushed apart from the linear-alignment with the rim projection 2. The screw 6 moves in the elongated hole 9 to allow the temple 1 to rotate more or less about the abutting point "O" at which the temple 1 abuts the rim projection 2, permitting the spring plate 7 to yieldingly bend, thus applying a resilient force to cause the temple 1 to the linear-alignment with the rim projection 2 as is the case with the "Spring Hinge".

The spring plate 7 can be soldered or bolted to the plateau of the bottom of the "U"-shaped base section. The bolting of the spring plate 7 to the bottom plateau may facilitate the putting of the curved end of the spring plate exactly against the curved surface of the cantilever-like projection 8.

Figure 4A:
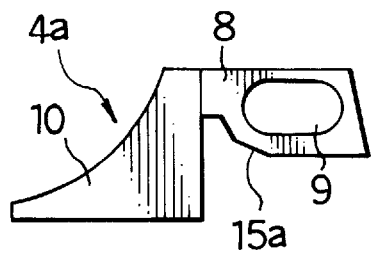
FIG. 4a is a side view of another embodiment of the first joint piece.
Figure 4B:
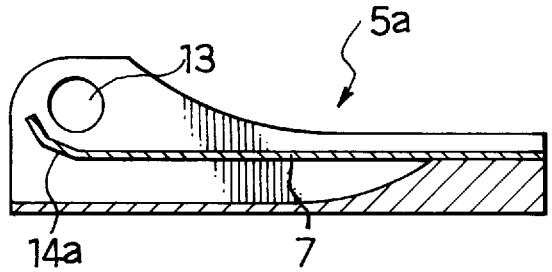
FIG. 4b is a section view of another embodiment of the second joint piece.

The cantilever-like joint section 8 of the first joint piece may be modified, as shown in FIG. 4a, by providing a bent surface 15a to the spring-abutting part close to the vertical wall of the stand section in place of the curved surface, and accordingly the spring plate has a bent end 14a, as shown in FIG. 4b, to be in conformity with the bent surface 15a of the cantilever-like joint section.

As may be understood from the above, a frame structure for glasses according to the present invention uses two counter joint pieces loosely coupled with a screw and a spring plate, assuring that the folding and unfolding of the temples, still permitting each temple to move a short distance from the 90 degree-wide opening or linear-alignment with the rim projection like the "Spring Hinge". The frame structure is simple and accordingly low in manufacturing cost. It has no slidable parts, thus causing no friction and hence, no wear, either.

What is claimed is:

1. A frame structure for eyeglasses comprising a front having two rims connected by a bridge and two temples each foldably hinged to the outer edge of each rim via a joint, each joint including first and second joint pieces fixed to the rim and the temple respectively, the first joint piece fixed to the rim comprising a curved joint section having an elongated hole formed therein and a surface having a curve therein, the second joint piece fixed to the temple comprising a joint section having a circular hole formed therein and an elongated spring plate extending to and abutting on the curved surface of the curved joint section of the first joint piece, said first and second joint pieces being rotatably coupled by a screw inserted in the elongated hole and the circular hole.

2. A frame structure for eyeglasses according to claim 1 wherein said first joint piece is composed of a relatively thick stand section fixed to the rim and a relatively thin, curved joint section integrally connected to the stand section and projecting therefrom, said curved joint section having an elongated hole made therein, and a lower edge close to the stand section having said curved surface and a flat surface; said second joint piece is composed of a "U"-shaped base section having two opposite trailing walls and a rising-and-levelling bottom, and an elongated spring plate, the trailing walls having circular holes formed therein, and the elongated spring plate being fixed to the plateau of the rising-and-levelling bottom to extend toward the fronts of the trailing walls, ending with a curved end, the curvature of the curved end corresponding to the curved surface of the curved joint section of said first joint piece; and said first joint piece is loosely coupled with said second joint piece by inserting the thin, curved joint section of said first joint piece in between the opposite trailing walls of said second joint piece with said elongated and circular holes aligned, and by inserting a screw in the elongated hole of the curved joint section of said first joint piece and the circular holes of the "U"-shaped base section of said second joint piece, so that the screw is allowed to move in the elongated hole of said first joint piece, thereby allowing said second joint piece and hence the temple to move relative to said first joint piece, and so that the curved end of the elongated spring plate abuts on the curved surface of the curved joint section of said first joint piece, thereby constantly applying a resilient force to the temple, which resilient force keeps the temple in a linear-alignment with a portion of the rim when the temple is raised to the unfolded position, and yielding to permit the temple to open outward more or less beyond the linear-alignment in response to a gentle opening force if applied to the temple, still forcing the temple to return to the linear-alignment with the portion of the rim, thus permitting the temple to be put in an equilibrium stable position.

3. A frame structure for eyeglasses comprising a front having two rims connected by a bridge and two temples each foldably hinged to the outer edge of each rim via a joint, each joint including first and second joint pieces fixed to the rim and the temple respectively, the first joint piece fixed to the rim comprising a bent joint section having an elongated hole formed therein and a surface having bend therein, the second joint piece fixed to the temple comprising a joint section having a circular hole formed therein and an elongated spring plate extending to and abutting on the bend surface of the bent joint section of the first joint piece, said first and second joint pieces being rotatably coupled by a screw inserted in the elongated hole and the circular hole.

4. A frame structure for eyeglasses according to claim 3, wherein said first joint piece is composed of a relatively thick stand section fixed to the rim and a relatively thin, bent joint section integrally connected to the stand section and projecting therefrom, said bent joint section having an elongated hole made therein, and a lower edge close to the stand section having said bend surface and a flat surface; said second joint piece is composed of a "U"-shaped base section having two opposite trailing walls and a rising-and-levelling bottom, and an elongated spring plate, the trailing walls having circular holes formed therein, and the elongated spring plate being fixed to the plateau of the rising-and-levelling bottom and extending toward the fronts of the trailing walls, ending with a bent-up end, a curvature of the bent-up end corresponding to the bend surface of the bent joint section of said first joint piece; and said first joint piece is loosely coupled with said second joint piece by inserting the thin, bent joint section of said first joint piece in between the opposite trailing walls of said second joint piece with said elongated and circular holes aligned, and by inserting a screw in the elongated hole of the bent joint section of said first joint piece and the circular holes of the "U"-shaped base section of said second joint piece, so that the screw is allowed to move in the elongated hole of said first joint piece, thereby allowing said second joint piece and hence the temple to move relative to said first joint piece, and so that the bent end of the elongated spring plate abuts on the bend surface of the joint section of said first joint piece, thereby constantly applying a resilient force to the temple, which resilient force keeps the temple in a linear-alignment with a portion of the rim when the temple is raised to the unfolded position, and yielding to permit the temple to open outward more or less beyond the linear-alignment in response to a gentle opening force if applied to the temple, still forcing the temple to return to the linear-alignment with the portion of the rim, thus permitting the temple to be put in an equilibrium stable position.

\* \* \* \* \*